(12) United States Patent
Tripathi et al.

(10) Patent No.: US 10,997,218 B2
(45) Date of Patent: May 4, 2021

(54) METHOD AND SYSTEM FOR MANAGING ASSOCIATIONS BETWEEN ENTITY RECORDS

(71) Applicant: Innoplexus AG, Eschborn (DE)

(72) Inventors: Gaurav Tripathi, Pune (IN); Vatsal Agarwal, Rampur (IN); Yannik T. H. Schelske, Eschborn (DE); Mohit Mangal, Jaipur (IN); Arpan Sheetal, Haranganj (IN); Nikhil Vinod Fulzele, Nagpur (IN)

(73) Assignee: Innoplexus AG, Eschborn (DE)

( * ) Notice: Subject to any disclaimer, the term of this patent is extended or adjusted under 35 U.S.C. 154(b) by 160 days.

(21) Appl. No.: 15/856,005

(22) Filed: Dec. 27, 2017

(65) Prior Publication Data

US 2019/0005118 A1 Jan. 3, 2019

Related U.S. Application Data

(60) Provisional application No. 62/462,857, filed on Feb. 23, 2017.

(51) Int. Cl.
| | |
|---|---|
| *G06F 16/28* | (2019.01) |
| *G06F 16/23* | (2019.01) |
| *G06F 16/2457* | (2019.01) |
| *G06F 16/215* | (2019.01) |
| *G06F 40/295* | (2020.01) |

(52) U.S. Cl.
CPC ......... *G06F 16/288* (2019.01); *G06F 16/215* (2019.01); *G06F 16/2365* (2019.01); *G06F 16/24575* (2019.01); *G06F 16/285* (2019.01); *G06F 40/295* (2020.01)

(58) Field of Classification Search
CPC .................................................... G06F 16/288
USPC ........................................................ 707/737
See application file for complete search history.

(56) References Cited

U.S. PATENT DOCUMENTS

| 2013/0024125 A1* | 1/2013 | Lystig | G16H 50/70 |
| | | | 702/19 |
| 2015/0149208 A1* | 5/2015 | Lynch | G06F 21/6254 |
| | | | 705/3 |
| 2017/0032477 A1* | 2/2017 | Kamen | G06F 16/285 |
| 2017/0076046 A1* | 3/2017 | Barnes | G06F 19/321 |

(Continued)

*Primary Examiner* — Syling Yen
(74) *Attorney, Agent, or Firm* — Ziegler IP Lew Group, LLC

(57) ABSTRACT

A method and system for managing associations between entity records. The method includes: identifying a first plurality of entity records in at least one curated database, associations between the first plurality of entity records based on at least one entity attribute and associations between entity attributes of the first plurality of entity records; extracting data records from existing data sources, wherein the data records comprise entity names and entity attributes associated with the entity names; identifying the entity names, and entity attributes corresponding to each of the entity names in each of the extracted data records; clustering the entity names and corresponding entity attributes to create a second plurality of entity records; and identifying associations between the second plurality of entity records based on the identified associations between the first plurality of entity records and/or identified association between entity attributes of the first plurality of entity records.

8 Claims, 2 Drawing Sheets

(56) References Cited

U.S. PATENT DOCUMENTS

2017/0270181 A1\* 9/2017 Lindner ................ G06F 16/215
2018/0096345 A1\* 4/2018 Salama .................. G06F 21/57

\* cited by examiner

METHOD AND SYSTEM FOR MANAGING ASSOCIATIONS BETWEEN ENTITY RECORDS

CROSS REFERENCE TO RELATED APPLICATIONS

This application claims priority to U.S. Provisional Patent Application No. 62/462,857, filed Feb. 23, 2017, which is hereby incorporated by reference in its entirety.

TECHNICAL FIELD

The present disclosure relates generally to data processing; and more specifically, to methods of managing associations between entity records. Furthermore, the present disclosure also relates to systems for managing associations between entity records. Moreover, the present disclosure also relates to computer readable medium containing program instructions for execution on a computer system, which when executed by a computer, cause the computer to perform method steps for managing associations between entity records.

BACKGROUND

With regard to technological as well as social advancement, research work and innovation require information regarding specific fields. Such research work requires data related to such specific fields. Conventionally, printed media used to act as source of data needed for the research work. However, digital media has now replaced the printed media as a source of data with easy accessibility and improved availability.

Generally, retrieving data spread across various centralized and/or distributed existing data sources is performed using existing data extraction techniques. Specifically, the existing data extraction techniques act upon search strings pertaining to a search entity name provided thereto. Subsequently, the existing techniques access the existing data sources and retrieve most relevant data records from the existing data sources. Specifically, the data records include entity names and entity attributes (namely, information) associated with the entity names. Furthermore, the entity names may be associated with each other in a way to provide additional information pertaining to context thereof.

However, the existing data extraction techniques may suffer with numerous performance issues. Such performance issues may include ambiguous identification of similar entity names. Specifically, the existing data extraction techniques may not be able to distinctively separate two or more similar entity names related to contextually different data records. Consequently, the existing data extraction techniques may require human intervention in order to remove such ambiguity among similar entity names by manually identifying contextual meaning thereof. Moreover, two or more entity names may be contextually associated and may pertain to a specific field. Furthermore, the existing data extraction techniques may not be able to determine such association between two or more entity names. Moreover, the existing data extraction techniques retrieve data only from homogeneous platforms. Additionally the existing data extraction techniques may be unable to extract data from existing data sources having heterogeneous (namely, different) format. Furthermore, data records that are extracted using the existing data extraction techniques may involve a lot of processing and time complexity as it includes ambiguous data therein. Consequently, such retrieval of data consumes a lot of human effort and time.

Therefore, in light of the foregoing discussion, there exists a need to overcome the aforementioned drawbacks associated with the existing data extraction techniques of managing associations between entity records.

SUMMARY

The present disclosure seeks to provide a method of managing associations between entity records. The present disclosure also seeks to provide a system for managing associations between entity records. The present disclosure seeks to provide a solution to the existing problem of ambiguous identification of associations between entity records. An aim of the present disclosure is to provide a solution that overcomes at least partially the problems encountered in the prior art, and provides a simple, efficient, robust, seamless, easy to implement and unambiguous solution for identification of association between entity records.

In one aspect, an embodiment of the present disclosure provides a method of managing associations between entity records, wherein the method comprises:
identifying a first plurality of entity records in at least one curated database, associations between the first plurality of entity records based on at least one entity attribute, and associations between entity attributes of the first plurality of entity records;
extracting data records from existing data sources, wherein the data records comprise entity names and entity attributes associated with the entity names;
identifying the entity names, and entity attributes corresponding to each of the entity names in each of the extracted data records;
clustering the entity names and corresponding entity attributes to create a second plurality of entity records; and
identifying associations between the second plurality of entity records based on the identified associations between the first plurality of entity records and/or identified association between entity attributes of the first plurality of entity records.

In another aspect, an embodiment of the present disclosure provides a system for managing associations between entity records, wherein the system comprises:
a database arrangement operable to store at least one curated database and existing data sources;
a communication module operable to retrieve at least one curated database and existing data sources; wherein the communication module is operatively coupled to a processing module; and
the processing module operable to:
identify a first plurality of entity records in at least one curated database, associations between the first plurality of entity records based on at least one entity attribute, and associations between entity attributes of the first plurality of entity records;
extract data records from existing data sources, wherein the data records comprise entity names and entity attributes associated with the entity names;
identify the entity names, and entity attributes corresponding to each of the entity names in each of the extracted data records;
cluster the entity names and corresponding entity attributes to create a second plurality of entity records; and identify associations between the second plurality of entity records based on the identified associations between the first plurality of entity records and/or identified association between entity attributes of the first plurality of entity records.

In yet another aspect, an embodiment of the present disclosure provides a computer readable medium containing program instructions for execution on a computer system, which when executed by a computer, cause the computer to perform method steps for managing associations between entity records, the method comprising the steps of:

identifying a first plurality of entity records in at least one curated database, associations between the first plurality of entity records based on at least one entity attribute, and associations between entity attributes of the first plurality of entity records;

extracting data records from existing data sources, wherein the data records comprise entity names and entity attributes associated with the entity names;

identifying the entity names, and entity attributes corresponding to each of the entity names in each of the extracted data records;

clustering the entity names and corresponding entity attributes to create a second plurality of entity records; and identifying associations between the second plurality of entity records based on the identified associations between the first plurality of entity records and/or identified association between entity attributes of the first plurality of entity records.

Embodiments of the present disclosure substantially eliminate or at least partially address the aforementioned problems in the prior art, and enables identification of association between two or more entity records and removes duplicity and ambiguity in entity records.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
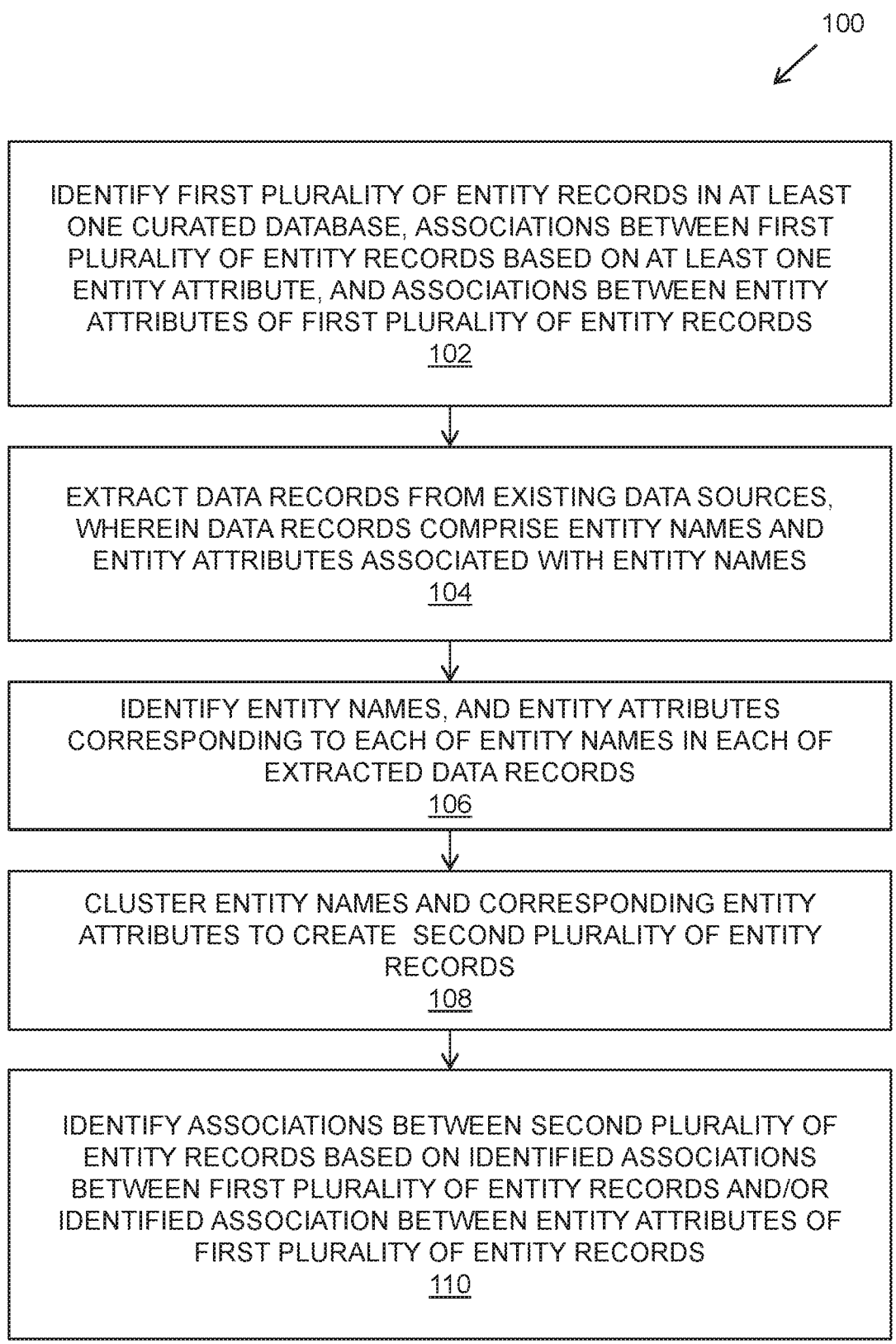
FIG. 1 illustrates steps of a method of managing associations between entity records, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a method of managing associations between entity records, wherein the method comprises:

identifying a first plurality of entity records in at least one curated database, associations between the first plurality of entity records based on at least one entity attribute, and associations between entity attributes of the first plurality of entity records;

extracting data records from existing data sources, wherein the data records comprise entity names and entity attributes associated with the entity names;

identifying the entity names, and entity attributes corresponding to each of the entity names in each of the extracted data records;

clustering the entity names and corresponding entity attributes to create a second plurality of entity records; and identifying associations between the second plurality of entity records based on the identified associations between the first plurality of entity records and/or identified association between entity attributes of the first plurality of entity records.

In another aspect, an embodiment of the present disclosure provides a system for managing associations between entity records, wherein the system comprises:

a database arrangement operable to store at least one curated database and existing data sources;

a communication module operable to retrieve at least one curated database and existing data sources; wherein the communication module is operatively coupled to a processing module; and the processing module operable to:

identify a first plurality of entity records in at least one curated database, associations between the first plurality of entity records based on at least one entity attribute, and associations between entity attributes of the first plurality of entity records;

extract data records from existing data sources, wherein the data records comprise entity names and entity attributes associated with the entity names;

identify the entity names, and entity attributes corresponding to each of the entity names in each of the extracted data records;

cluster the entity names and corresponding entity attributes to create a second plurality of entity records; and identify associations between the second plurality of entity records based on the identified associations between the first plurality of entity records and/or identified association between entity attributes of the first plurality of entity records.

The present disclosure provides the aforementioned method of managing associations between entity records. Furthermore, the method identifies associations among plurality of entity names in one or more entity records. Furthermore, the method also determines associations among two or more entity attributes. Moreover, the method reduces duplicity of data and optimizes further processing of the data. Furthermore, the described method provides a simpler and optimal way of with association based retrieval of data from existing data sources. Beneficially, the described method enables extraction of data in different formats and stored at heterogeneous platforms. Additionally, the method is further operable to identify associations between entities written in a human readable language. Additionally, the method described herein does not require human intervention for functioning thereof. Furthermore, the method exhibits a very low computational (namely, processing) and time complexity. Moreover, the system described herein is simple and inexpensive.

Throughout the present disclosure, the term "entity records" refers to structured (namely, organized) collection of the data (namely, elements) based on contextual association between one or more entity records. Furthermore, an entity records may comprise comprehensive information about an entity therein. Specifically, an entity may represent one or more persons, organizations, objects, domains and so forth. More specifically, such information may be represented by way of entity name and entity attributes of the entity records. Optionally, the data in the entity records may have different data types, string length (namely, number of bits) and size, wherein size of the data refers to memory space consumed in order to store the data. Additionally, the entity records are most relevant and unambiguous data related to the entities. Moreover, the entity records may include the data in the form of text, audio, video, image and/or a combination thereof. Specifically, the entity records are obtained by accessing at least one curated database.

As mentioned previously, the system for managing associations between entity records comprises: the database arrangement operable to store at least one curated database and existing data sources. The term "database arrangement" relates to an organized body of digital information regardless of the manner in which the data or the organized body thereof is represented. Optionally, the database arrangement may be hardware, software, firmware and/or any combination thereof. For example, the organized body of related data may be in form of a table, a map, a grid, a packet, a datagram, a file, a document, a list or in any other form. The database arrangement includes any data storage software and systems, such as, for example, a relational database like IBM DB2 and Oracle 9. Furthermore, the data storage and systems may include MongoDB, HBase, ElasticSearch, Neo4J, ArangoDB and so forth. Additionally, the database arrangement refers to the software program for creating and managing one or more databases. Optionally, the database arrangement may be operable to supports relational operations, regardless of whether it enforces strict adherence to the relational model, as understood by those of ordinary skill in the art. Additionally, the database arrangement populated by data elements. Furthermore, the data elements may include data records, bits of data, cells are used interchangeably herein and all intended to mean information stored in cells of a database. Moreover, the database arrangement is communicably coupled to the communication module facilitating storage and retrieval and of first plurality of entity records and data records to and from the at least one curated database and the existing data sources, respectively.

Furthermore, the system for managing associations between entity records further comprises: the communication module operable to retrieve at least one curated database and existing data sources; wherein the communication module is operatively coupled to the processing module. The term "communication module" relates to an arrangement of interconnected programmable and/or non-programmable components that are configured to facilitate data communication between one or more electronic devices, software modules and/or databases, whether available or known at the time of filing or as later developed. Additionally, the communication module includes wired or wireless communication that can be carried out via any number of known protocols, including, but not limited to, Internet Protocol (IP), Wireless Access Protocol (WAP), Frame Relay, or Asynchronous Transfer Mode (ATM). Moreover, any other suitable protocols using voice, video, data, or combinations thereof, can also be employed. Optionally, the communication module may be software, hardware, firmware and/or a combination thereof. Specifically, the communication module is capable of transmitting data from one or more module and/or device to another one or more module and/or device. Optionally, the communication module may be connected to the database arrangement using a wired and/or a wireless connection. Specifically, the communication module may retrieve target data from the database arrangement using a network. Examples of the network may include, but are not limited to, Furthermore, the network may include, but is not limited to, one or more peer-to-peer networks, a hybrid peer-to-peer network, local area networks (LANs), radio access networks (RANs), metropolitan area networks (MANS), wide area networks (WANs), all or a portion of a public network such as the global computer network known as the Internet, a private network, a cellular network and any other communication system or systems at one or more locations.

Furthermore, the system for managing associations between entity records comprises the processing module. The term "processing module" relates to a computational element that is operable to respond to and process instructions that carry out the method. Optionally, the processing module includes, but is not limited to, a microprocessor, a microcontroller, a complex instruction set computing (CISC) microprocessor, a reduced instruction set (RISC) microprocessor, a very long instruction word (VLIW) microprocessor, or any other type of processing circuit. Furthermore, the term "processing module" may refer to one or more individual processors, processing devices and various elements associated with a processing device that may be shared by other processing devices. Additionally, the one or more individual processors, processing devices and elements are arranged in various architectures for responding to and processing the instructions that drive the system. The processing module is operatively coupled to the communication module. The at least one curated database and the existing data sources are received by the processing module.

As mentioned previously the method of managing associations between entity records comprises: identifying the first plurality of entity records in at least one curated database. Specifically, the processing module is operable to identify the first plurality of entity records in at least one curated database. Furthermore, the at least one curated database is accessed to identify the first plurality of entity records. Furthermore, the at least one curated database refers a structured database comprising selected sets of data representing a plurality of entities by way of entity names and associated entity attributes having significance in determining associations between plurality of concepts included in the at least one curated database. Optionally, the at least one curated database includes information in form of text, image, audio, video, or any combination thereof. In an example, the database arrangement may be a relational or NoSQL database.

Moreover, the first plurality of entity records includes entity names and entity attributes associated with the entity names. Additionally, the term "entity name" relates to subject of information included in the first plurality of entity records. Specifically, the first plurality of entity records includes information related to the entity name. Optionally, the entity names may belong to one or more persons, organizations, objects, company, domains and so forth. Furthermore, the first plurality of entity records includes fields of information about the entity names. Specifically, fields of information about the entity names are entity attributes. Additionally, the entity attributes may include data in form of text, audio, video, image and/or a combination thereof. Furthermore, the entity attributes may be analysed in order to identify association between the first plurality of entity records. Optionally, the first plurality of entity records may be organized in a tabular form. Additionally, first cell in a column may include the entity name and remaining cells in the column may include the entity attributes.

The method of managing associations between the entity records further comprises: identifying associations between the first plurality of entity records based on at least one entity attribute. Specifically, the processing module is further operable to identify associations between the first plurality of entity records based on at least one entity attribute. Furthermore, at least one entity attribute associated with a pair of entity records of the first plurality of entity records may be analysed and compared in order to identify association thereof. Specifically, the first plurality of entity records having similar and/or identical entity attributes exhibit an association therebetween. Optionally, the at least one entity attribute associated with a pair of entity records of the first plurality of entity records may be compared by calculating a similarity score thereof. In an example, the similarity score may be calculated by applying techniques such as minhash, simhash and so forth. Optionally, two or more entity attributes having high similarity score may be treated as identical data. Consequently, such treatment may be capable of eliminating or correcting language errors.

In a first example, a curated database may comprise information regarding a college. Additionally, the college may have two or more departments associated thereto. Furthermore, each department may have employees associated thereto. Moreover, the curated database may be accessed and the two or more departments associated with the college may be identified as a first plurality of entity records. Furthermore, the departments may be associated with each other based on identical entity attributes such as identical college name, identical geolocation and so forth associated thereto. Moreover, each department may have one or more professors working therein. Consequently, the one or more professors working in each department may be considered as entity attribute associated to entity names such as the two or more departments.

As mentioned previously, the method of managing associations between the entity records further comprises: identifying associations between entity attributes of the first plurality of entity records. Specifically, the processing module is further operable to identify associations between entity attributes of the first plurality of entity records. Furthermore, the first plurality of entity records exhibit a parent-child relationship with entity attributes associated thereto. Specifically, the first plurality of entity records acts as parent and the entity attribute associated thereto acts as child thereof. Moreover, association between the entity attributes of the first plurality of entity records is identified by processing thereof as entity name. Subsequently, entity attributes associated thereto are compared in order to identify association therebetween.

Referring to the first example, association between two or more professors associated with each department may be identified by processing thereof as an entity record. Subsequently, the two or more professors may be taken as entity name and may have one or more entity attributes associated thereto. Subsequently, two or more the professor may exhibit identical college name, department name and/or geolocation associated thereto. Optionally, the two or more professors may further exhibit identical departments associated thereto as an entity attribute. Consequently, association between the two or more professors may be identified.

Furthermore, optionally, identification of the first plurality of entity records, associations between the first plurality of entity records and associations between entity attributes of the first plurality of entity records provides a reference model for identification of entity names and entity attributes associated thereto.

As mentioned previously, the method of managing associations between entity records comprises: extracting data records from the existing data sources, wherein the data records comprise entity names and entity attributes associated with the entity names. Specifically, the processing module is operable to extract data records from existing data sources, wherein the data records comprise entity names and entity attributes associated with the entity names. Furthermore, the existing data sources comprise data records related to field of user's interest. Moreover, the term "existing data sources" relates to organized or unorganized bodies of digital information regardless of manner in which data is represented therein. Optionally, the existing data sources are structured and/or unstructured. Additionally, optionally, the existing data sources may be hardware, software, firmware and/or any combination thereof. For example, the existing data sources may be in form of tables, maps, grids, packets, datagrams, files, documents, lists or in any other form. The existing data sources include any data storage software and systems, such as, for example, a relational database like IBM, DB2, Oracle 9 and so forth. Moreover, the existing data sources may include the data records in form of text, audio, video, image and/or a combination thereof.

In an embodiment, the term "data records" relates to information retrieved by extracting the existing data sources. Furthermore, the data records include relevant information related to a plurality of entities. Specifically, such information may have scattered, inconsistent and missing values. Moreover, the data records may include data in form of text, audio, video, image and/or a combination thereof. For example, the data records may be in form of tables, maps, grids, packets, datagrams, files, documents, lists or in any other form. Furthermore, the data records comprise entity names and entity attributes associated with the entity names. Specifically, entity names relate to subject of user's field of interest. Additionally, entity attributes associated to the entity names provide information pertaining to the entity names.

Optionally, extracting data records from the existing data sources comprises cleaning and/or translating the data records. Furthermore, cleaning of the data records may be done by deleting unnecessary fields such as comments, symbols, identifiers and so forth. Additionally, cleaning may also include removing noisy patches (namely, data) from the extracted data records. In an example, cleaning may be performed by parsing the data records into at least one token. Beneficially, cleaning of data records reduces redundancy and density (namely, content density) of the extracted data records. Moreover, data records may be translated to a predetermined standard language. In an example, the standard language may be a machine readable language. Optionally, the standard language may be a human understandable universal language such as English.

As mentioned previously, the method of managing associations between entity records comprises: identifying the entity names, and entity attributes corresponding to each of the entity names in each of the extracted data records. Specifically, the processing module is operable to identify the entity names, and entity attributes corresponding to each of the entity names in each of the extracted data records. Furthermore, identification of entity names and entity attributes is done by tokenization of extracted data records. Subsequently, tokenized data records are analysed in order to identify the entity names and entity attributes corresponding to each of the entity names. Optionally, identification of entity names and entity attributes associated thereto may be done by applying Name Entity Resolution (NER) techniques.

In a second example, an existing data source related to a hospital may comprise data records (namely, information) regarding departments of the hospital such as neurological, orthopaedic and maternity departments. Furthermore, the existing data source may also comprise information pertaining to doctors associated with the departments in the hospital. Moreover, the department names may be treated as entity names and the name of the hospital may be treated as an entity attribute associated thereto. Furthermore, the existing data source may be traversed using a sequential or random accessing method. Subsequently, data records pertaining to neurological, orthopaedic and maternity departments may be extracted. Moreover, the data records may be parsed, tokenized and subsequently analysed in order to identify the entity names and entity attributes corresponding to each of the entity names. Furthermore, the doctors associated with a specific department may also be extracted as data records and may have the name of the department as an entity attribute in respective data records thereof.

As mentioned previously, the method of managing associations between entity records further comprises: clustering the entity names and corresponding entity attributes to create the second plurality of entity records. Specifically, the processing module is operable to cluster the entity names and corresponding entity attributes to create a second plurality of entity records. Furthermore, the extracted data records pertaining to identical entity names are clustered together. Beneficially, such clustered entity names and corresponding entity attributes provide optimized information regarding identified entity names in each of the extracted data records. Consequently, the second plurality of entity records comprise non-duplicate and identified (namely, correct) entity names and entity attributes associated thereto. Optionally, clustering methods such as K-means clustering, hierarchical clustering methods and so forth may be applied in order to generate clusters.

Optionally, clustering of entity records may involve removal of copies of identical entity attributes associated with identical entity names. Consequently, such removal of duplicated entity attribute fields may reduce information density of the clustered entity records. Therefore, such clustering may be able to optimize further processing of the clustered entity records.

In an example, two or more data records pertaining to a maternity department of a hospital may have similar entity names and include one or more identical entity attributes and one or more mutually exclusive entity attributes. Subsequently, such data records pertaining to the maternity department may be clustered together in order to create an entity record comprising all the entity attributes pertaining to the maternity department.

Optionally, the method of managing associations between entity records comprises analysing geolocation of the entity names of the second plurality of entity records based on at least one curated database. Specifically, the processing module is further operable to analyse the geolocation of the entity names of the second plurality of entity records based on at least one curated database. Specifically, geolocation of an entity name (or, an entity) may be identified by analysing information comprised in at least one curated database. Furthermore, geolocation of the entity names may be analysed by accessing entity attributes associated thereto. Beneficially, geolocation of identical entity names may be compared in order to establish association therebetween. Alternatively, geolocation of identical entity names may be compared in order to establish unique identity thereof.

Referring to the second example, association between two or more data records pertaining to neurological department may be identified by analysing geolocation of entity names of the two or more data records. Consequently, data records comprising a geolocation similar to the neurological department may be associated with the data record for neurological department. Subsequently, similar geolocation of two or more data records exhibit association thereof to one entity record. Alternatively, different geolocation of two or more data records exhibit association thereof to two different entity records.

As mentioned previously, the method of managing associations between entity records comprises: identifying associations between the second plurality of entity records based on the identified associations between the first plurality of entity records. Specifically, the processing module is operable to identify associations between the second plurality of entity records based on the identified associations between the first plurality of entity records. Furthermore, associations between the second plurality of entity records is identified by performing comparison thereof with identified associations between the first plurality of entity records. Optionally, comparison of the second plurality of entity records may be calculated by employing similarity calculation techniques such as minhash, simhash, edit distance and so forth. In an example, two or more entity records in the first plurality of entity records having identical entity attribute exhibiting a unique value may have an association therebetween. Similarly, two or more entity records in the second plurality of entity records having identical entity attribute exhibiting a unique value may have an association therebetween.

Referring to the first and second example, entity records in the first example may be considered as the first plurality of entity records and entity records in the second example may be considered as the second plurality of entity records. Furthermore, the first plurality of entity records may comprise entity records such as mathematics department and science department having same geolocation and college name associated thereto as entity attributes. Therefore, such entity records in the first plurality of entity records may have an association therebetween. Similarly, the second plurality of entity records such as maternity department and neurology department may have same geolocation and hospital name associated thereto as entity attributes. Therefore, association between such entity records in the second plurality of entity records may be identified based on the identified association between the first plurality of entity records.

Furthermore, the method of managing associations between entity records comprises: identifying associations between the second plurality of entity records is further based on identified association between entity attributes of the first plurality of entity records. Specifically, the processing module is operable to identify associations between the second plurality of entity records based on identified association between entity attributes of the first plurality of entity records Furthermore, associations between the second plurality of entity records is identified by performing comparison thereof with identified associations between entity attributes of the first plurality of entity records. Moreover, entity attributes of the first plurality of entity records are analysed using the processing module. Subsequently, entity attributes of the first plurality of entity records with identical entity names and/or one or more entity attributes associated thereto exhibit an association therebetween. Specifically, an association may be identified between entity attributes of the first plurality of data records. Consequently, the processing module may identify an association between similar entity attributes of at least a pair of the second plurality of entity records. Therefore, an association may be identified between at least the pair of entity records of the second plurality of data records based on the identified association between the entity attributes of the first plurality of data records.

In an example, the first plurality of entity records may comprise entity records of a first pair of doctors working in different departments of a hospital. Therefore, the entity records may have the departmental information and hospital information as entity attributes of the entity records of the first pair of doctors. Furthermore, the entity attributes (namely, departmental information) of the entity records of the first pair of doctors may have an association (namely, the hospital). Consequently, such association between the entity attributes of the entity attributes of first plurality of data records is identified by the processing module. Subsequently, the second plurality of data records may comprise entity records of a second pair of doctors working in different departments of a hospital. Therefore, the processing module may detect an association between the entity records of second pair of doctors based on the similar identified association between the entity attributed of the first pair of doctors in the first plurality of records.

Optionally, identifying associations between the second plurality of entity records comprises: comparing at least one entity attribute of the second plurality of entity records with entity attributes of the first plurality of data records. Specifically, the processing module is operable to identify associations between the second plurality of entity records by comparing at least one entity attribute of the second plurality of entity records with entity attributes of the first plurality of data records. Furthermore, at least one entity attribute of the second plurality of entity records may be compared with entity attributes of the first plurality of data records in order to derive contextual and/or relational similarity thereof. Consequently, association between the second plurality of entity records may be established based on the derived contextual and/or relational similarity of the two compared entity attributes.

Optionally, identifying associations between the second plurality of entity records further comprises: identifying entity records with similar entity attributes associated therewith from the second plurality of entity records. Specifically, the processing module is operable to identify associations between the second plurality of entity records by identifying entity records with similar entity attributes associated therewith from the second plurality of entity records. Furthermore, entity attributes associated with entity attributes in the second plurality of entity records may be analysed in order to recognize entity records having association therebetween. Optionally, the second plurality of entity records may be stored in a tabular data structure. Furthermore, entity names and entity attributes associated thereto may be different fields of a row. Moreover, the row comprising the entity names and entity attributes may be referred as an entity record. Therefore, each row in the tabular data structure may represent an entity record. Subsequently, each column may have entity attribute data that may be compared in order to identify entity records with similar entity attributes associated therewith. Referring to the second example, two entity records namely maternity and neurology departments may have identical entity attributes such as identical hospital name and geolocation may be associated thereto. Consequently, the two entity records may be having association therebetween.

Optionally, identifying associations between the second plurality of entity records further comprises: identifying associations between the similar entity attributes associated with the second plurality of entity records based on at least one curated database. Specifically, the processing module is operable to identify associations between the second plurality of entity records by identifying associations between the similar entity attributes associated with the second plurality of entity records based on at least one curated database. Furthermore, association between the first plurality of entity records in the at least one curated database may be analysed and referenced for deducing associations between the similar entity attributes associated with the second plurality of entity records. Specifically, two or more entity records in the first plurality of entity records with one or more identical entity attribute data having less chances of irrelevance may have an association therebetween. Similarly, two or more entity records in the second plurality of entity records with one or more identical entity attribute data having less chances of irrelevance may be having an association therebetween.

In an example, two entity attributes related to two employees may have entity attributes of company identification number and geolocation thereof may have association therebetween. Furthermore, the association may be taken as co-workers referring to identical company identification number and geolocation thereof.

Optionally, identifying associations between the second plurality of entity records further comprises: identifying associations between the second plurality of entity records based on the associated entity attributes of the second plurality of data-records. Specifically, the processing module is operable to identify associations between the second plurality of entity records by identifying associations between the second plurality of entity records based on the associated entity attributes of the second plurality of data-records. Furthermore, two or more entity attributes associated with two or more entity records in the second plurality of entity records having an association therebetween link (namely, associate, affiliate) the two or more entity records in the second plurality of entity records together. Additionally, associated entity attributes of the second plurality of entity records may have identical and/or similar one or more associated metadata related thereto. Therefore, the second plurality of entity records may have an association based on identical metadata associated with entity attributes corresponding thereto. Referring to the second example, entity attributes two doctors associated with entity names maternity and orthopaedic department respectively may have identical hospital name and geolocation associated thereto. Consequently, the entity records of maternity and orthopaedic department may have association therebetween as entity attributes thereof exhibit association therebetween.

Optionally, the method of managing associations between entity records comprises identifying the class of at least one entity attribute of the second plurality of entity records based on at least one curated database. Specifically, the processing module is operable to identify a class of at least one entity attribute of the second plurality of entity records based on at least one curated database. Furthermore, the at least one entity attribute of the first plurality of entity records in the at least one curated database may be classified based on type entity name associated thereto. Additionally, the entity attribute may be classified as a company, institute, research organization, academy and so forth. Similarly, the at least one entity attribute of the second plurality of entity records may be classified based on references derived from classification in the at least one curated database. Furthermore, the class of at least one entity attribute of the second plurality of entity records may be determined by applying Name Entity Resolution (NER) techniques on the of at least one entity attribute of the second plurality of entity records. In an example, entity names comprising data elements such as private limited may be included in the class named company. In another example, entity names comprising data elements such as institute may be included in the class named academy.

Furthermore, there is disclosed a computer readable medium containing program instructions for execution on a computer system, which when executed by a computer, cause the computer to perform method steps for managing associations between entity records, the method comprising the steps of identifying a first plurality of entity records in at least one curated database, associations between the first plurality of entity records based on at least one entity attribute, and associations between entity attributes of the first plurality of entity records; extracting data records from existing data sources, wherein the data records comprise entity names and entity attributes associated with the entity names; identifying the entity names, and entity attributes corresponding to each of the entity names in each of the extracted data records; clustering the entity names and corresponding entity attributes to create a second plurality of entity records; and identifying associations between the second plurality of entity records based on the identified associations between the first plurality of entity records and/or identified association between entity attributes of the first plurality of entity records.

Optionally, the computer readable medium comprises one of a floppy disk, a hard disk, a high capacity read only memory in the form of an optically read compact disk or CD-ROM, a DVD, a tape, a read only memory (ROM), and a random access memory (RAM).

DETAILED DESCRIPTION OF THE DRAWINGS

Referring to FIG. 1, illustrated are steps of a method 100 for managing associations between entity records, in accordance with an embodiment of the present disclosure. The method 100 is executable by a processing module. At a step 102, a first plurality of entity records in at least one curated database are identified. Furthermore, associations between the first plurality of entity records are identified based on at least one entity attribute and associations between entity attributes of the first plurality of entity records are identified. At a step 104, data records from existing data sources are extracted, wherein the data records comprise entity names and entity attributes associated with the entity names. At a step 106, the entity names, and entity attributes corresponding to each of the entity names in each of the extracted data records are identified. At a step 108, the entity names and corresponding entity attributes are clustered to create second plurality of entity records. At a step 110, associations between the second plurality of entity records are identified based on the identified associations between the first plurality of entity records and/or identified association between entity attributes of the first plurality of entity records.

Figure 2:
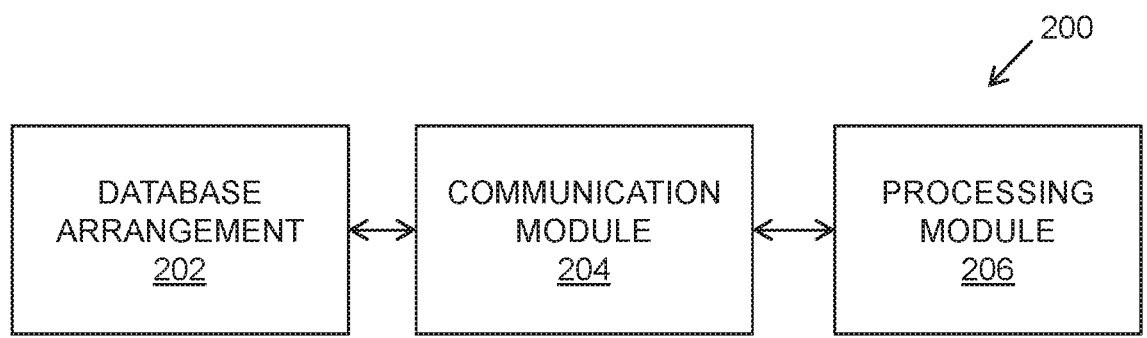
FIG. 2 is a block diagram of a system for managing associations between entity records, in accordance with an embodiment of the present disclosure.

Referring to FIG. 2, illustrated is a block diagram of a system 200 for managing associations between entity records, in accordance with an embodiment of the present disclosure. The system 200 comprises a database arrangement 202 operable to store curated database and existing data sources. Furthermore, the system 200 comprises a communication module 204. The communication module 204 is operatively coupled to the processing module 206 and the database arrangement 202. Furthermore, the communication module 204 provides an interface for communication of the processing module 206 and the database arrangement 202. The processing module 206 is operable to extract data records from the curated database and the existing data sources, wherein the data records comprise entity names and entity attributes associated with the entity names.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. A method of managing associations between entity records, wherein the method comprises:
   a) extracting data records from existing data sources stored in a relational database, wherein the data records comprise entity names and entity attributes associated with each of the entity names, wherein each of the entity names belong to different entity;
   b) identifying the entity names, and entity attributes corresponding to each of the entity name in each of the extracted data records;
   c) clustering the entity names and corresponding entity attributes to create a second plurality of entity records, wherein the clustering is performed based on similar entity attributes of the entity names;
   d) comparing one or more geolocations between the second plurality of entity records and a first plurality of entity records stored in at least one curated database to determine at least one identical geolocation;
   e) identifying associations between the second plurality of entity records and the first plurality of entity records based on the determination of the at least one identical geolocation between the second plurality of entity records and the first plurality of entity records; and f) identifying associations between entity names in the second plurality of entity records based on the entity attributes and geolocations corresponding to each of the entity names in the second plurality of entity records.

2. The method of claim 1, wherein the method comprises identifying a class of at least one entity attribute of the second plurality of entity records based on at least one curated database.

3. The method of claim 1, wherein the method comprises analysing a geolocation of the entity names of the second plurality of entity records based on at least one curated database.

4. The method of claim 1, wherein extracting data records from the existing data sources comprises cleaning and/or translating the data records.

5. A system for managing associations between entity records, wherein the system comprises:
   a relational database configured to store at least one curated database and existing data sources;
   a communication module configured to retrieve at least one curated database and existing data sources; wherein the communication module is operatively coupled to a processing module; and
   the processing module configured to:
      a) extract data records from existing data sources stored in the relational database, wherein the data records comprise entity names and entity attributes associated with each of the entity names, wherein each of the entity names belong to different entity;
      b) identify the entity names and entity attributes corresponding to each of the entity names in each of the extracted data records;
      c) cluster the entity names and corresponding entity attributes to create a second plurality of entity records, wherein the clustering is performed based on similar entity attributes of the entity names;
      d) compare one or more geolocations between the second plurality of entity records and a first plurality of entity records stored in at least one curated database to determine at least one identical geolocation;
      e) identify associations between the second plurality of entity records and the first plurality of entity records based on the determination of the at least one identical geolocation between the second plurality of entity records and the first plurality of entity records; and
      f) identify associations between entity names in the second plurality of entity records based on the entity attributes and geolocations corresponding to each of the entity names in the second plurality of entity records.

6. The system of claim 5, wherein the processing module identifies a class of at least one entity attribute of the second plurality of entity records based on at least one curated database.

7. The system of claim 5, wherein the processing module analyses a geolocation of the entity names of the second plurality of entity records based on at least one curated database.

8. The system of claim 5, wherein extracting data records from the existing data sources comprises cleaning and/or translating the data records.

* * * * *